(12) United States Patent
Potenza et al.

(10) Patent No.: US 8,462,796 B2
(45) Date of Patent: Jun. 11, 2013

(54) METHOD FOR EXCHANGING INFORMATION AMONG DIGITAL UNITS IN A DISTRIBUTED SYSTEM

(75) Inventors: Leonardo Potenza, Imola (IT); Graziano Mazzuchetti, Malalbergo (IT); Carlo Rossi, Bologna (IT); Andrea Tilli, Bologna (IT); Pierantonio Ragazzini, Forli (IT)

(73) Assignee: Ima Industria Macchine Automatiche S.p.A., Ozzano dell'Emilia (BO) (IT)

( * ) Notice: Subject to any disclaimer, the term of this patent is extended or adjusted under 35 U.S.C. 154(b) by 758 days.

(21) Appl. No.: 11/989,491

(22) PCT Filed: Jul. 25, 2006

(86) PCT No.: PCT/EP2006/007326
§ 371 (c)(1),
(2), (4) Date: May 13, 2008

(87) PCT Pub. No.: WO2007/017099
PCT Pub. Date: Feb. 15, 2007

(65) Prior Publication Data
US 2009/0097504 A1    Apr. 16, 2009

(30) Foreign Application Priority Data
Jul. 28, 2005 (EP) .................................. 05425557

(51) Int. Cl.
*H04L 7/00* (2006.01)
(52) U.S. Cl.
USPC ........................ 370/395.62; 370/519; 700/3
(58) Field of Classification Search
USPC ........ 370/395.62, 517–519; 375/226; 377/78; 700/3, 14, 19, 61, 169, 170
See application file for complete search history.

(56) References Cited

U.S. PATENT DOCUMENTS

| | | | | |
|---|---|---|---|---|
| 4,821,203 A | * | 4/1989 | Carlton et al. | 700/228 |
| 5,418,932 A | * | 5/1995 | Watabe et al. | 713/500 |
| 5,530,323 A | * | 6/1996 | Breitzmann | 318/85 |
| 5,796,221 A | * | 8/1998 | Cramer et al. | 318/68 |
| 5,812,618 A | * | 9/1998 | Muntz et al. | 375/372 |

(Continued)

FOREIGN PATENT DOCUMENTS

| | | |
|---|---|---|
| EP | 0 312 671 A1 | 4/1989 |
| JP | P2000-278277 A | 10/2000 |

OTHER PUBLICATIONS

International Search Report for PCT/EP2006/007326 mailed Oct. 4, 2006.

(Continued)

*Primary Examiner* — Michael Thier
*Assistant Examiner* — Curtis A Alia
(74) *Attorney, Agent, or Firm* — Nixon & Vanderhye PC

(57) ABSTRACT

Method for exchanging information among digital units in a distributed system, with digital units being defined by at least a master node and slave nodes, involves transferring information references from a master node to slave nodes, the information references being sampled with sampling time corresponding to a cycle time period defined by a clock value of the master node. The method also involves estimating the number of the information references sampled arrived to the slave node from the master nodes during a periodic reference time interval, and using the number to recalculate the master clock value, so that the slave nodes are able to reconstruct master node information references during a following reference time interval.

16 Claims, 5 Drawing Sheets

U.S. PATENT DOCUMENTS

| | | | |
|---|---|---|---|
| 5,920,214 | A | 7/1999 | Lee et al. |
| 6,134,285 | A | 10/2000 | Lo |
| 6,424,687 | B1 | 7/2002 | Tian et al. |
| 6,909,728 | B1 * | 6/2005 | Kuribayashi et al. ......... 370/518 |
| 6,990,109 | B2 * | 1/2006 | Mitchell et al. .......... 370/395.62 |
| 7,710,981 | B2 * | 5/2010 | Blancha et al. .......... 370/395.62 |
| 7,773,606 | B2 * | 8/2010 | Dobjelevski et al. .... 370/395.62 |
| 2002/0114354 | A1 * | 8/2002 | Sinha et al. ................... 370/503 |
| 2002/0131454 | A1 * | 9/2002 | Franke et al. ................. 370/503 |
| 2003/0114938 | A1 * | 6/2003 | Albrecht et al. ................... 700/2 |
| 2003/0191544 | A1 * | 10/2003 | Faulhammer et al. ............ 700/3 |
| 2004/0062332 | A1 | 4/2004 | Dabral et al. |
| 2004/0258097 | A1 * | 12/2004 | Arnold et al. ................. 370/503 |

OTHER PUBLICATIONS

Japanese Office Action mailed Nov. 8, 2011, issued in corresponding Japanese Application No. 2008-523222, which English translation.

* cited by examiner

METHOD FOR EXCHANGING INFORMATION AMONG DIGITAL UNITS IN A DISTRIBUTED SYSTEM

CROSS REFERENCE TO RELATED APPLICATIONS

This application is National Phase of PCT International Application No. PCT/EP2006/007326, filed Jul. 25, 2006. PCT/EP2006/007326 claims priority to European Patent Application No. 05425557.5, filed Jul. 28, 2005. The entire contents of these applications are incorporated herein by reference.

TECHNICAL FIELD OF THE INVENTION

The present invention relates to a method for exchanging information among digital units in a distributed system. Especially, the present invention can be applied to solve communication problems in a distributed digital control used to motion control of operating parts of an automatic machine, in particular automatic packaging machine, to which reference is made specifically in the present technical description albeit implying no limitation of the scope.

BACKGROUND ART

An automatic machine is a complex multi-purpose mechanism consisting of many operating heads directly acting on products.

To obtain a good behavior of the machine, it is very important a correct coordination among every part of it.

In the early days of automatism, first mechanisms were coordinated in a mechanical way, i.e. via a main cam, connected to the main shaft and creating a trajectory that was the physical reference for the other elements of the mechanism.

Nowadays, thanks to the evolving of electric motors, power electronics and digital control and communications, the way these elements are controlled has deeply changed.

The architecture is shown in the annex FIG. 1.

As it can be seen, the motion control system of an automatic machine is a distributed system.

It is composed by digital units, called nodes, exchanging information with other units through a shared communication bus.

In particular, there are one master node M, i.e. the central unit, and many other slave nodes $S_i$, linked with the electromechanical axes that have to be controlled.

Every digital node of the system executes a time-driven algorithm repeatedly triggered by its own internal clock, which is characterized by a nominal time interval (the so-called "cycle time").

In general, in modern complex systems, each digital node can execute different algorithms, "tasks", at the same time (multitask systems), each one characterized by its own cycle time. For this kind of systems the generalization of the communication and synchronization problem considered in the following is straightforward. Instead of the communication between Master and Slave nodes, the communication between a particular task in the Master and a particular task in the Slave should be considered.

Let $\Delta T$ and $\Delta t_i$ be the cycle times of the master and of the i-th slave respectively. Usually, they are designed to be equal or synchronized with a fixed integer ratio. Indeed, if no active synchronization is provided by the network system, this "design assumption" is not realistic, since each node clock is affected by inaccuracy, drift and jitter.

The main purpose of the master is the coordination of all the axes, usually obtained providing the slave nodes with velocity or position references to track for the actuators.

At run-time, every reference is sampled with a sampling time equal to the period of the cycle time of the master.

Then every sample is sent to the slave via a digital bus and collected by the slave with a sampling time equal to the slave cycle time.

It is important to note that not only the value of the sample is relevant, but also the corresponding time instant, even if this information it is not directly provided with the data item.

Moreover, the exchanging mode of such information depends on the implementation of the communication system, i.e. the bus protocol.

Anyway, whatever the adopted protocol is, if the master broadcasts a data the slave will get it with a variable time delay. So, it is possible to define the difference between the longer and the shorter delay as the jitter of the system. Finally, the transmission delay can increase owing to problems like data collision or traffic congestion on the network.

The aim of the present invention is therefore to provide an exchanging information method for overcoming the above-mentioned drawbacks.

Especially, the scope of the present invention is to solve the communication and synchronization transmission problems in a distributed system as above described.

SUMMARY OF THE INVENTION

According to the invention, it is described a method for exchanging information among digital units in a distributed system, with digital units being defined by at least a master node and slave nodes, comprising the step of transferring information references from said master node to said slave nodes, said information references being sampled with sampling time corresponding to a cycle time period defined by clock value of said master node; wherein the method comprises further steps of estimating the number of said information references sampled arrived to said slave node from said master node during a periodic reference time interval, and using said number to recalculate the master clock value, so that said slave nodes are able to reconstruct master node information reference during a following reference time interval.

BRIEF DESCRIPTION OF THE DRAWINGS

The present invention will be described by way of example with reference to the attached drawings showing schematic and diagrammatic views of a preferred but not limiting embodiment of an exchanging information apparatus, in which.

DESCRIPTION OF THE PREFERRED EMBODIMENTS

Figure 2:
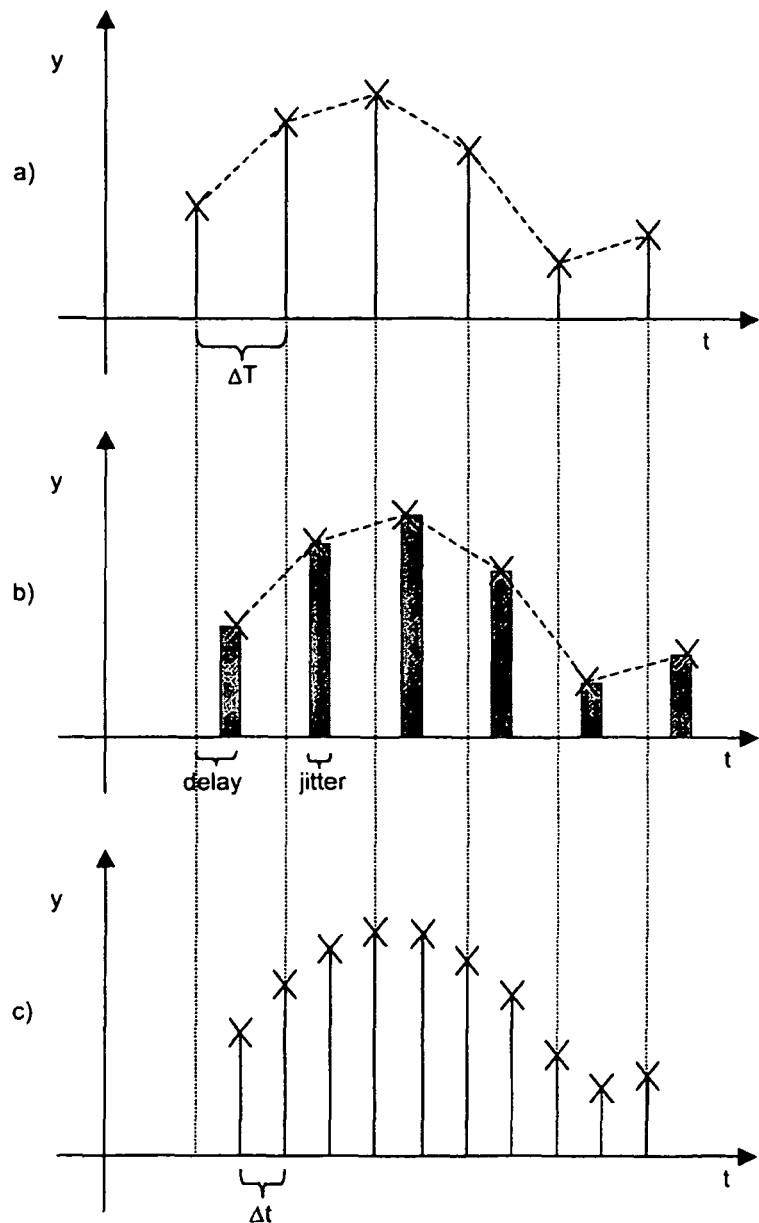
FIG. 2 is a schematic view, showing a sampling of the master (a), data transmission (b) and resampling of the slave (c)

The main scope of the present invention is to transfer the samples, with respect to their implicit temporal position, of a given trajectory from the master M to the slave $S_i$. If the internal clocks of both the nodes were perfectly synchronized, without any drift or digitalization error, a simple and effective communication could be obtained, despite of transmission delay and jitter, as shown in FIG. 2 (where $\Delta T/\Delta t$ is 2 and the clock ticks are assumed perfectly aligned).

The waveform would be sampled with the known sample time $\Delta T$ of the master (FIG. 2-a), then it would be transmitted to the slave with a delay and a jitter, whose bounds are known (FIG. 2-b), and here resampled and reconstructed through interpolation by the slave with its own temporization $\Delta t$ (FIG. 2-c), only a fixed delay, multiple of $\Delta t$, has to be introduced to cope with the transmission channel non-ideality.

All these steps can be taken supposing the slave perfectly knows the value of $\Delta T/\Delta t$, the alignment between master and slave clock ticks and the maximum transmission delay. With these hypothesis the slave always knows when a valid data transmitted by the master is available and its temporization; therefore there is no need for a consistency data control. Indeed, the nominal value of a clock is not perfectly equal to its effective value.

Figure 1:
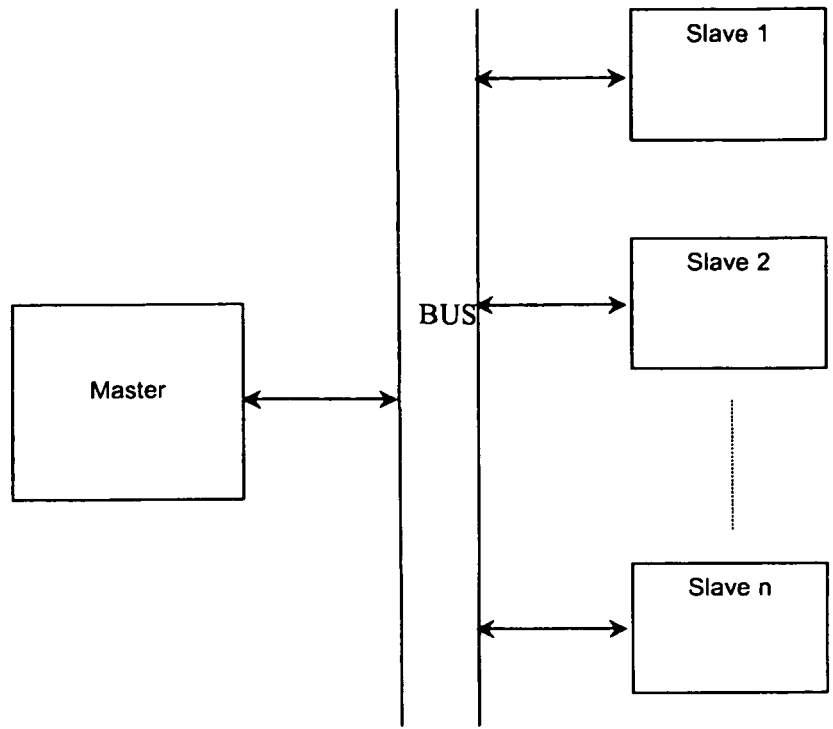
FIG. 1 shows a typical architecture of a distributed system.
Figure 3:
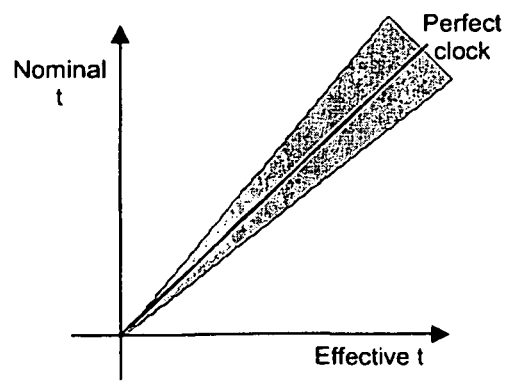
FIG. 3 shows a drift rate of a real clock.

For example, if 4 msec is the nominal value, the effective one could be 3.9999 msec or 4.001 msec, i.e. with a little drift and a corresponding drift rate (the shaded area shown in FIG. 3). Therefore, the actual relation between master and slave clocks is not exactly known.

A suitable low-level synchronization system can be provided by some digital communication busses, to avoid the above mentioned trouble and guarantee an almost perfect synchronization between the different node clocks. In the following, the case of no direct synchronization between the node clocks is considered, i.e. each node clock runs independently of the others.

In general, the relation between the master and slave cycle times can be written as follows:

$$\frac{\Delta T}{\Delta t} = \frac{n}{m} + \Delta n,$$

where n, m are integer values and $\Delta n$ is the number in interval [0 1/m[.

At the design stage of the control system, a nominal relation between master and slave cycle times is defined as follows:

$$\left.\frac{\Delta T}{\Delta t}\right|_{Nom} = \frac{n_{Nom}}{m_{Nom}} = \Delta n_{Nom}$$

where, again, $n_{Nom}$, and $m_{Nom}$ are integer and $\Delta n_{Nom}$ is a number in interval [01/m[; usually $n_{Nom}$, is sensibly larger than $m_{Nom}$ is imposed equal to zero, for the sake of simplicity.

According to previously-mentioned node clocks non idealities, the following considerations can be derived:
 the actual values n, m, $\Delta n$ are not exactly equal to $n_{Nom}$, respectively, owing to node clocks inaccuracy;
 the values n, m, $\Delta n$ are not constant since:
  long-term frequency of the node clocks is not perfectly constant;
  jitter affects the node clocks.

The jitter between Master and Slave clocks determines the same effect as the jitter in the transmission delay, hence it can easily compensated, according to the procedure illustrated in FIG. 2, assuming a suitable delay in reference reconstruction in the slave node.

Differently, the unknown mismatch of actual $\Delta T/\Delta t$ with respect to the nominal one and its long-term drifting cannot be compensated with a fixed delay as proposed in FIG. 2, since the drift error accumulates with the passing of time. Possible consequences of this problem are a data can be overwritten before it has been used or the same data could be used twice, in both cases causing spikes in velocity trajectory and loss of synchronization with the other axes.

Algorithm Proposed to Solve the Synchronization Problem

The objective of the following algorithm is to reconstruct with a sampling time $\Delta t$ the reference trajectory previously sampled by the master node with a sampling time $\Delta T$ knowing there are uncertainties on the data transmission (jitter) and, as mentioned before, the relation between the two clocks is not exactly known a-priori.

Moreover, also the following constraints have to be satisfied:
 a reconstruction with a minimum and constant, as possible, delay;
 no data loss or prediction.

First of all, as the reconstruction is done using the slave cycle time, $\Delta t$, the slave clock will be assumed as the global time of the system (i.e. other clocks will be characterized and represented with respect to the slave clock).

Therefore the time basis will have a $\Delta t$ granularity and at each tick of such clock a reconstructed trajectory sample has to be generated.

In order to manage the transmission delay and jitters (due to transmission channel and master and slave clocks inaccuracy) a suitable delay can be used as indicated in FIG. 2.

On the other hand, to cope with the effects of the drift of $\Delta T$ with respect to $\Delta t$ (due to the fact that actual $\Delta T/\Delta t$ is not equal to $(\Delta T/\Delta t)_{Nom}$), a periodic resynchronization of the data coming from the master (with respect to the global time defined by the slave) must be defined, introducing in this way a data flow control.

The basic idea is to estimate how many data samples arrive from the master to the slave during a periodic reference time window; this information can then be used by the slave to recalculate the master clock value.

Using this new local knowledge of the master clock, the slave will be able to reconstruct the master reference trajectory during the following reference time window.

Let's consider a fixed number n of slave samples and define a length for reference time window of n*$\Delta t$.

Supposing for simplicity that master and slave are in perfect relation, i.e. the equation n*$\Delta t$=m*$\Delta T$ is satisfied, it is possible to define a master clock having a granularity equal to (n*$\Delta t$)/m, similarly as it is done for the slave.

Moreover, suppose that the starting time of the two time basis is the same.

Figure 4:
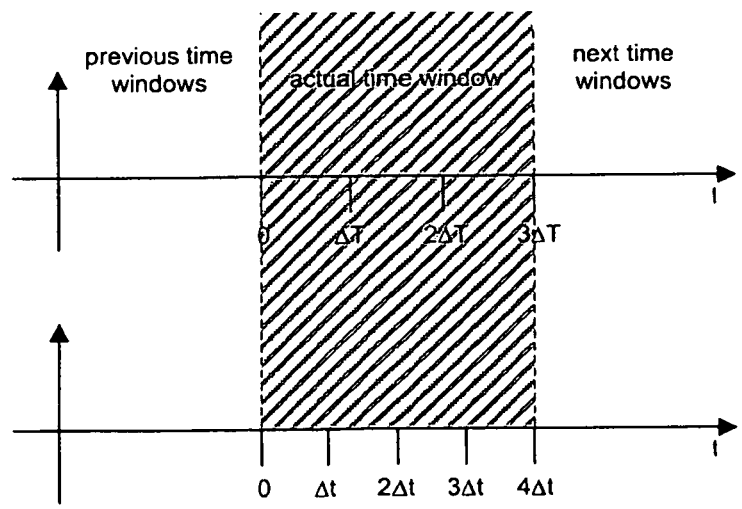
FIG. 4 shows a relation between the clocks during an interval time windows.

The FIG. 4 shows the relation between the two clocks within a reference time window in the simple case of n=4, m=3.

So, it is possible to define:
 m, the number of samples provided by the master and used in a time window;
 n, the number of samples created by the slave in a time window;
 i, the i-th sample provided by the master and used in a time window, with i=0, . . . , m;
 s, the s-th sample created through interpolation by the slave in a time window, with s=0, . . . , n;

$T_i$, the time instant of the i-th sample, that will be equal to $i*\Delta T$;

$t_s$ the time instant of the s-th sample, that will be equal to $s*\Delta t$.

For the initialization of the algorithm, values for n and m have to be chosen. This choice can be based on the nominal value of $\Delta T$ and $\Delta t$ and it has to satisfy the equation $n*\Delta t = m*\Delta T$.

n will be the same for every reference time window, while m will be changed according to its estimation (but it will be considered constant inside a given time window).

The slave reference trajectory samples will be calculated starting from the master original samples by means of a linear interpolation formula.

Figure 5:
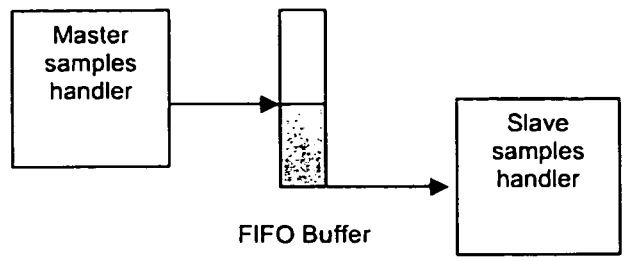
FIG. 5 shows an algorithm implementation.

As we need two original samples to obtain one or more interpolated value, there must be a buffer to store the master samples (see FIG. 5).

This buffer will be managed using a FIFO (First In First Out) policy: as soon as a new master sample is received, it is stored at the end of the buffer; when a new sample is needed for the slave samples calculation, it is extracted from the head of the buffer.

The last two data extracted from the buffer are always the two values to interpolate; in the following we will call them $x_{previous}$ (e.g. the sample at time $T_1$) and $x_{next}$ (e.g. the sample at time $T_2$).

The number of samples in the buffer should always be "big enough" to guarantee that the buffer is never empty when a new sample is needed for the slave samples calculation (buffer underrun), but "not too big", to avoid extreme delays in the reference trajectory reconstruction. So we can set a buffer reference level to maintain.

The condition that must be satisfied to keep using the current $x_{previous}$ and $x_{next}$ values for the slave samples calculation is the following:

$$t_s \leq T_i$$

As soon as this condition is not valid, a new sample has to be extracted from the buffer and $x_{previous}$ and $x_{next}$ must be re-defined accordingly.

Considering that $t_s = s*\Delta t$, $T_i = i\Delta T$ and $n*\Delta t = m*\Delta T$, the previous condition can be rewritten as:

$$s \leq i*\frac{n}{m}.$$

Defining now $$s' = s \cdot m$$

and $$i' = i \cdot n$$

where $s = 0, \ldots, n$ and $i = 0, \ldots, m$,
the previous condition can be rewritten as:

$$s' \leq i'$$

As mentioned before, if this condition is satisfied, the s-th interpolated value $x_s$, can be obtained via a linear interpolation between the $x_{next}$ and $x_{previous}$ master samples.

Once we have reached the end of a reference time window, the estimation of how many samples being used in the next time window (the new m value) is achieved, i.e. it is defined the granularity of the next time window.

The estimation can be done monitoring the buffer level and using a standard regulator (e.g. a deadbeat regulator).

In particular the estimation process can be divided into two different steps:

a) the calculation of an $\tilde{m}$ value by simply evaluating how many data have been received during the last time window;

b) the calculation of the actual m value starting from the former $\tilde{m}$ value and applying a correction factor in order to guarantee that the buffer level is maintained close to a user defined buffer reference level.

With reference to abocecited step a), the calculation can simply consider how many original values have been used and what is the variation in the buffer level.

If the buffer level at the end of a reference time window is greater than the buffer level at the beginning of the time window, the number of the received data is greater than the data that have been used.

With reference to step b), the correction factor can be proportional to the difference between the actual buffer level and the reference buffer level.

If necessary, the insertion of a dead-zone can be considered (i.e. the correction factor can be activated only if the difference between the actual buffer level and the reference buffer level is greater than a given value).

Once the new m value is available, i and s can be resetted to 0 and the algorithm can start the slave samples calculation in the next reference time window.

If the two clocks were in perfect relation, after the first m value estimation, the m value would be the same for all of the time windows.

The presence of the jitter and of the $\Delta n$ produces a varying m from one time windows to the other.

The effect of these variations is that the velocity trajectory has a little step up or down, depending on how much m increases or decreases in relation with its value. In order to reduce the effect of these variations, the n value should be chosen "big enough".

In fact, the error accumulated during a time window will be spread in the following time window.

Obviously, the higher is m, the lower is the incidence of the error.

Algorithm Implementation

The intent of this section is to show an implementation of the above synchronization algorithm (see FIG. 5).

The algorithm implementation can be splitted up into two different procedures:
the master samples handler procedure
the slave samples handler procedure The master samples handler procedure has to be executed as soon as a new reference trajectory sample is received by the slave from the master (therefore with a nominal period of $\Delta T$). Basically this procedure is responsible for the insertion of the master samples in the FIFO buffer.

The slave samples handler procedure has to be executed (periodically) with the slave sampling time $\Delta t$.

This procedure is responsible for the master samples extraction from the buffer, the slave samples calculation and the m value estimation.

The procedure is responsible for the control of the buffer level as well.

Figure 6A:
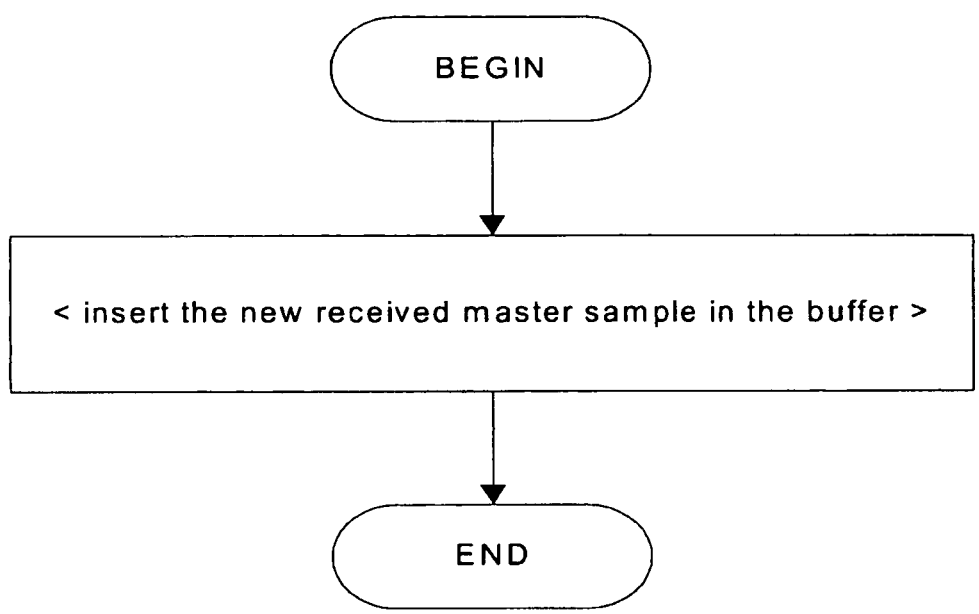
FIGS. 6a and 6b show a flow-chart of algorithm implementation of FIG. 5, respectively of the master samples handler procedure and slave samples handler procedure.
Figure 6B:
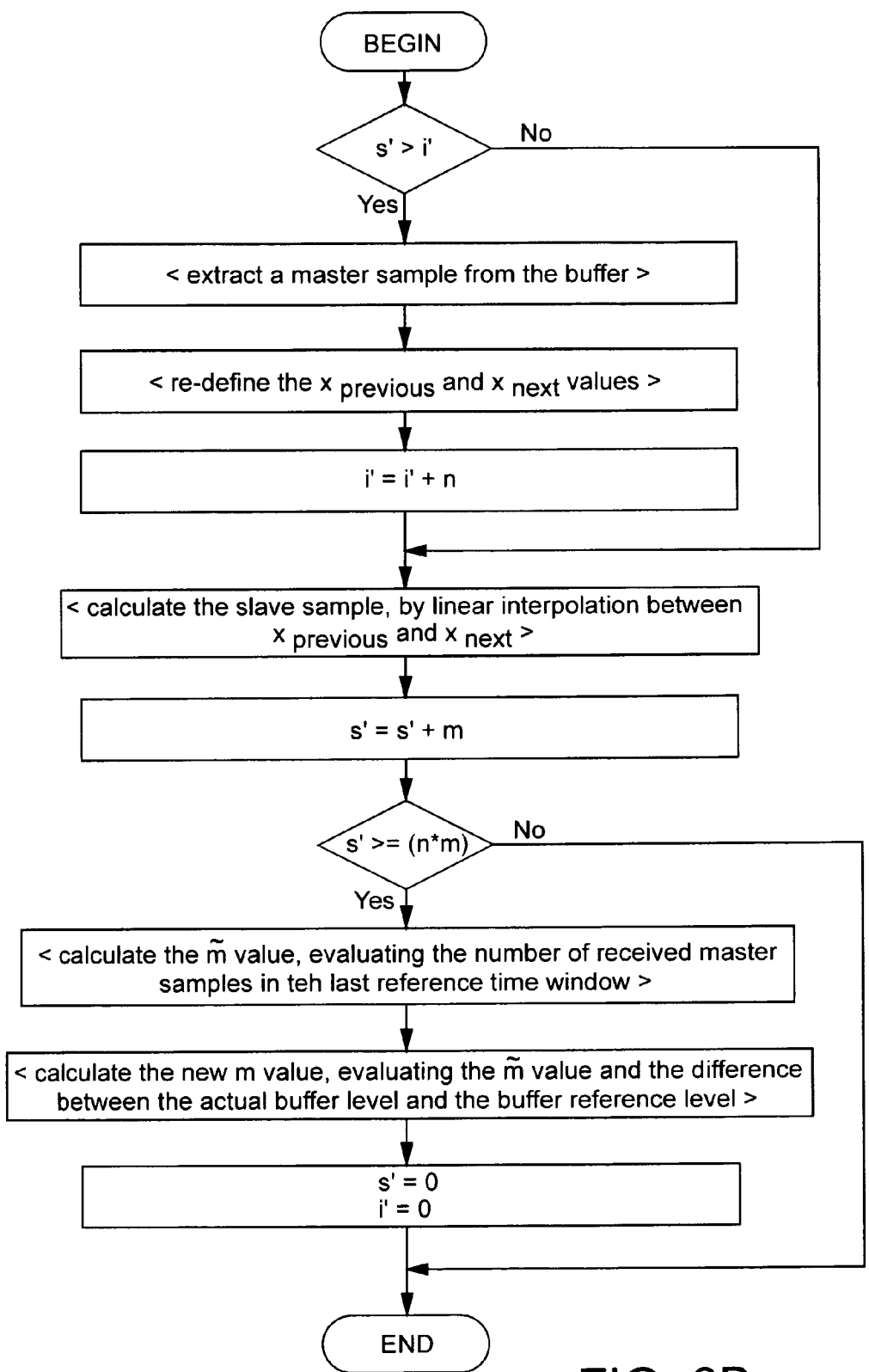

According to FIG. 6, a simple flow chart for each of the above procedures is shown.

Algorithm Initialization

For a proper initialization of the algorithm, the following conditions must be satisfied:

$$m = (\Delta t_{nom}/\Delta T_{nom}) * n$$

$$i' = s' = 0$$

Buffer Level=Buffer Reference Level+Delta, with Delta>0 where n and the Buffer Reference Level are user-defined parameters.

The invention claimed is:

1. A method for controlling motion of operating parts of an automatic machine by means of exchanging information among digital units in a distributed system, with said digital units being defined by at least a master node and slave nodes, said distributed system controlling said motion, said master node controlling a main axis of said automatic machine, said slave node controlling at least a respective slave axis, said method comprising the steps of:
    transferring information references master samples from said master node to said slave nodes, said information references master samples being sampled with sampling time corresponding to a cycle time period defined by a clock value of said master node;
    estimating the number of said information references sampled arrived to said slave node from said master node during a periodic reference time interval by monitoring a level of a buffer used for storing said master node samples; and
    using said number to recalculate the master clock value at said slave node, so that said slave nodes are able to reconstruct a master node information reference during a following reference time interval by means of generating a slave sample with a sampling time corresponding to a cycle time period defined by a clock value of said slave node, said slave sample having a value calculated from said received master samples;
    wherein said motion of operating parts of the automatic machine is controlled by using all and exclusively said generated slave samples.

2. The method according to claim 1, wherein said I recalculation is realized by a linear interpolation and by using said buffer for storing more master node samples.

3. The method according to claim 2, wherein said buffer is a first in-first out type buffer.

4. The method according to claim 1, wherein said slave nodes are linked with respective electromechanical axes of an automatic packaging machine, the motion of which is to be controlled.

5. The method according to claim 1, wherein said information references comprise at least a couple of values, one of such value being a time value.

6. A method for controlling motion of operating parts of an automatic machine by means of exchanging information among digital units in a distributed system, said distributed system controlling said motion and comprising a master unit controlling a main axis of said automatic machine and at least a slave unit controlling at least a respective slave axis of said automatic machine, said master unit having a nominal master clock cycle time and said slave unit having a nominal slave clock cycle time, said method comprising:
    transferring from said master unit a given trajectory of motion to said slave unit such as to coordinate said main axis with said slave axis, said transferring comprising:
        sampling at said master unit said given trajectory each master time tick to obtain master samples;
        transmitting said master samples from said master unit to said slave unit;
        receiving said master samples at said slave unit at uncertain time instants; and
        reconstructing said trajectory at said slave unit by means of generating each slave time tick a slave sample calculated from said received master samples,
    wherein said method further comprises:
        storing said master samples at said slave unit on a memory buffer; and
        associating the value of each master sample received at said slave unit with a calculated slave time instant, said calculated slave time instant being obtained at said slave unit by using said nominal slave cycle time and a variable master cycle time;
    said variable master cycle time being periodically calculated on a slave time window by counting how many samples had arrived at said slave unit during last slave time window by monitoring a level of a buffer used for storing said samples,
    wherein said trajectory at said slave unit is reconstructed by using all and exclusively said generated slave samples calculated from said received master sample.

7. The method according to claim 6 wherein said reconstructing comprises:
    checking each slave time tick if said slave time tick is within a time interval defined by a previous calculated time instant associated to a previous master sample and a next calculated time instant associated to a next master sample, to generate each slave time tick said slave sample.

8. The method according to claim 7 wherein if said slave time tick is greater than said next calculated time instant, said reconstructing further comprises:
    redefining the value of said previous master sample by copying on it the value of said next master sample,
    extracting from said buffer a new master sample, and
    redefining the value of said next master sample by copying on it the value of said extracted master sample.

9. The method according to claim 7, wherein said reconstructing further comprises interpolating said previous master sample and said next master sample to obtain a reconstructed trajectory, the values of said slave samples being on said reconstructed trajectory.

10. The method according to claim 9, wherein said interpolation is a linear interpolation.

11. The method according to claim 7, wherein said memory buffer is a first-in first-out buffer, said previous master sample being extracted from said buffer earlier than said next master sample.

12. The method according to claim 6, wherein said method further comprises:
    checking if each calculated slave time instant is within a present slave time window: and
    calculating said variable master cycle time if said calculated slave time instant falls within next slave time window.

13. The method according to claim 6, wherein said slave time window is a multiple of said slave clock cycle time.

14. The method according to claim 6, wherein said slave time window is a multiple of said nominal master cycle time.

15. The method according to claim 6, wherein said variable master cycle time is calculated by applying a correction factor to the variable master cycle time calculated on a previous slave time window.

16. The method according to claim 15, wherein said correction is proportional to the difference between the number of samples received in the slave time window and a predefined buffer reference level number.

* * * * *